3,795,599
Patented Mar. 5, 1974

3,795,599
SULPHOXIDATION OF ALIPHATIC HYDROCARBONS USING ULTRAVIOLET LIGHT AND A BORON COMPOUND

David John Rees, Kennington, England, assignor to United States Borax & Chemical Corporation, Los Angeles, Calif.
No Drawing. Filed Mar. 8, 1972, Ser. No. 232,931
Claims priority, application Great Britain, Mar. 11, 1971, 6,559/71
Int. Cl. B01j 1/10
U.S. Cl. 204—162 SA      10 Claims

ABSTRACT OF THE DISCLOSURE

Sulphoxidation of aliphatic hydrocarbons is improved by addition of small amount of boron compound to the reaction mixture.

---

This invention relates to an improved method for the preparation of alkane sulphonic acids.

Sulphoxidation of aliphatic hydrocarbons is usually performed by the reaction of a hydrocarbon with a gaseous mixture of sulphur dioxide and oxygen, according to Equation 1:

$$\text{AlkH} + \text{SO}_2 + \tfrac{1}{2}\text{O}_2 \rightarrow \text{Alk}\cdot\text{SO}_2\text{OH} \quad (1)$$

The reaction of Equation 1 is initiated by ultraviolet light and is known to proceed by means of the formation and destruction of free radicals, as shown in Equations 2 to 6:

$$\text{AlkH} \rightarrow \text{Alk}^* + \text{H}^* \quad (2)$$

$$\text{Alk}^* + \text{SO}_2 \rightarrow \text{AlkSO}_2^* \quad (3)$$

$$\text{AlkSO}^*_2 + \text{O}_2 \rightarrow \text{AlkSO}_2\text{—O—O}^* \quad (4)$$

$$\text{AlkSO}_2\text{—O—O}^* + \text{AlkH} \rightarrow \text{AlkSO}_2\text{—O—OH} + \text{Alk}^* \quad (5)$$

$$\text{AlkSO}_2\text{—O—OH} + \text{H}_2\text{O} + \text{SO}_2 \rightarrow \text{AlkSO}_2\text{OH} + \text{H}_2\text{SO}_4 \quad (6)$$

The reactions of Equations 2 to 6 suffer from the disadvantage that further free-radical side-reactions may occur, leading to the formation of undesirable products such as sulphones, ethers, and sulphonate esters, or a mixture of these, with consequent reduction in yield of the desired sulphonic acid. Further, since the formation of free sulphuric acid (Equation 6) terminates the reaction, it is necessary to minimize the amount of $H_2SO_4$ formed if a good yield of sulphonic acid is to be obtained.

It has been found that the addition of boron compounds to the reaction mixture has several advantages:

(a) The quantity of sulphuric acid formed as a reaction product is reduced;

(b) The reaction mixture separates into two layers; the lower layer containing the product and the upper layer containing the unreacted hydrocarbon and most of the boron compound. The system may thus be made to run as a continuous process;

(c) A clear or only slightly colored reaction mixture is obtained, thereby facilitating continuous ultra-violet initiation of the process;

(d) As a result of the addition of the boron compounds, the number of undesirable side-reactions is reduced and an improved yield of alkane sulphonic acid is obtained at a higher reaction rate.

Accordingly, the invention provides a process for the production of alkane sulphonic acids which comprises sulphoxidating an aliphatic hydrocarbon in the presence of certain boron compounds. The process is especially useful for sulphoxidating the hydrocarbons containing about 14 to about 17 carbon atoms.

The beneficial effect of the boron compound results from the scavenging action of the boron compound (represented as $BX_3$) on the $AlkSO_2\text{—O—O}^*$ radical, as shown in Equations 7 to 9.

$$\text{AlkSO}_2\text{—O—O}^* + BX_3 \rightarrow \text{AlkSO}_2\text{O}\overset{+}{\text{O}}\overset{-}{BX_3} \quad (7)$$

$$\text{AlkSO}_2\text{O}\overset{+}{\text{O}}\overset{-}{BX_3} \rightarrow \text{AlkSO}_2\text{OBX}_2 + X^* + \tfrac{1}{2}\text{O}_2 \quad (8)$$

$$\text{AlkSO}_2\text{OBX}_2 + \tfrac{1}{2}\text{O}_2 + X^* + \text{AlkH} + \text{H}_2\text{O} \rightarrow \\ \text{AlkSO}_2\text{OH} + BX_3 + \text{Alk}^* + \text{H}_2\text{SO}_4 \quad (9)$$

The boron compound represented as "$BX_3$" in Equations 7 to 9 may be an alkali or alkaline earth metal borate, including the borate ores, tetraborates and metaborates, boric acid, boron oxide, a trialkyl borate ester, a glycol diborate ester, an alkyl polyborate, or a polyol-borate condensation product of the type of U.S. Pat. 2,979,524. Examples of such boron compounds suitable for use in the present process include:

sodium tetraborate (borax)
potassium tetraborate
sodium metaborate
calcium borate
boric oxide
sodium calcium borate
colemanite ore
ulexite ore
boric acid
tributyl borate
triethyl borate
tripropyl borate
trihexyl borate
tri-hexylene glycol biborate
propylene glycol-borax condensate
butylene glycol-sodium metaborate condensate
butyne-1,4-diol-borax condensate
hexyleneglycol-potassium tetraborate condensate
tri-2-ethylhexyl borate
tridodecyl borate
trioctylene glycol biborate
triethylene glycol biborate
butyl polyborate
octyl polyborate
propyl polyborate.

Thus, the alkyl polyborates and trialkyl borate esters can have up to about eighteen carbon atoms in the alkyl groups. The glycol diborate esters and polyol-borate condensates have from about 2 to 8 carbon atoms in the glycol or polyol chain, which may optionally have additional side chains.

According to this invention, a boron compound as hereinbefore described and an aliphatic hyrocarbon are mixed together and a gaseous mixture of sulphur dioxide and oxygen is passed through the mixture for several hours. The concentration of boron compound should be from about 0.5 up to 10–20% by weight of hydrocarbon, preferably from about 3 to 8%. The temperature of the reaction is maintained at about 30° to about 50° C. The product is collected and analyzed by conventional means well known to the art.

The following examples illustrate the invention.

EXAMPLE I n-Hexadecane (50 ml.) and tri-n-butyl borate (6.0 g.) were placed in a reaction vessel maintained in a nitrogen atmosphere at 40° C. Sulphur dioxide (100 ml./min.) and oxygen (10 ml./min.) were passed through the reaction mixture for a period of 10 hours. During this time the reaction vessel was continuously subjected to ultraviolet light. After 10 hours the product was converted to its sodium salt by reaction with sodium hydroxide, and extracted and purified by conventional means. The yield of product was 17 g. as $C_{16}H_{33}SO_2 \cdot ONa$.

EXAMPLE II

An identical preparation without the addition of the boron compound yielded 9.5 g. of sodium n-hexadecane sulphonate.

EXAMPLE III n-Hexadecane (425 ml.) and tri-n-butyl borate (80 g.) were treated according to Example I. After 10 hours, separation into two layers started, and after 40 hours a total of 220 ml. of lower (product) layer had been formed. At intervals during the reaction, the product layer was run off in 50 ml.-portions and corresponding amounts of n-hexadecane added.

The yield was 350 g. as $C_{16}H_{33}SO_2 \cdot ONa$. More than 80% of the borate ester was recovered from the upper layer.

EXAMPLE IV

A reaction according to Example III was carried out without the addition of the boron compound. No separation of the reaction mixture was observed until the reaction had proceeded for 20 hours. The reaction mixture was extensively blackened, as were the walls of the reaction vessel, and the yield was only 49.5 g. as $$C_{16}H_{33}SO_2 \cdot ONa$$

EXAMPLES V–IX

The procedure of Examples I was followed using various boron compounds as additives to the reaction mixture. The following results were obtained.

| Ex. No. | n-Hexa-decane (ml.) | Boron compound used (amount) | Yield of product —$C_{16}H_{33}SO_2 \cdot ONa$ (grams) |
|---|---|---|---|
| V | 50 | $Na_2B_4O_7 \cdot 4H_2O$, 8 g | 25 |
| VI | 50 | $H_3BO_3$, 8 g | 16 |
| VII | 50 | $B_2O_3$, 8 g | 11 |
| VIII | 50 | Hexamethylene glycol biborate, 9 g. | 13 |
| IX | 50 | Colemanite, 10 g | 12 |

Various changes and modifications of the invention can be made end, to the extent that such variations incorporate the spirit of this invention, they are intended to be included within the scope of the appended claims.

What is claimed is:

1. The process for the sulphoxidation of an aliphatic hydrocarbon containing about 14 to 17 carbon atoms which comprises reacting said aliphatic hydrocarbon with a gaseous mixture of sulfur dioxide and oxygen at a temperature of about 30° to about 50° C. in the presence of about 0.5 to 20% by weight of a boron compound, based on the weight of said aliphatic hydrocarbon, and ultraviolet light, said boron compound being selected from the group consisting of the alkali or alkaline earth metal borates, boric acid, boric oxide, trialkyl borates, glycol diborates, alkyl polyborates, and polyol-borate condensation products.

2. The process according to claim 1 in which said boron compound is present in an amount corresponding to about 3 to 8% by weight of said aliphatic hydrocarbon.

3. The process according to claim 1 in which said boron compound is a trialkyl borate.

4. The process according to claim 1 in which said boron compound is a sodium or calcium borate.

5. In the process for the sulphoxidation of an aliphatic hydrocarbon containing about 14 to 17 carbon atoms by reaction of said aliphatic hydrocarbon with sulfur dioxide and oxygen at a temperature of about 30° to about 50° C. in the presence of ultraviolet radiation, the improvement which comprises including in the reaction mixture a catalytic amount of at least 0.5% by weight of a boron compound selected from the group consisting of the alkali or alkaline earth metal borates, boric acid, boric oxide, trialkyl borates, glycol diborates, alkyl polyborates, and polyol-borate condensation products.

6. The process according to claim 5 in which said boron compound is a trialkyl borate.

7. The process according to claim 5 in which said boron compound is present in an amount corresponding to about 3 to about 8% by weight of said aliphatic hydrocarbon.

8. The process according to claim 1 in which said boron compound is tri-n-butyl borate.

9. The process according to claim 1 in which said boron compound is borax.

10. The process according to claim 5 in which said boron compound is tri-n-butyl borate.

References Cited

UNITED STATES PATENTS

| 2,702,273 | 2/1955 | Kennedy et al. | 204—162 SA |
| 3,413,337 | 11/1968 | Bost | 204—162 SA |
| 3,372,188 | 3/1968 | Alston et al. | 204—162 SA |

BENJAMIN R. PADGETT, Primary Examiner

U.S. Cl. X.R.

204—162 R